United States Patent
Lightstone et al.

(10) Patent No.: US 10,006,984 B2
(45) Date of Patent: Jun. 26, 2018

(54) METHOD, APPARATUSES AND SYSTEM FOR IMPROVED WIRELESS DEVICE LOCATION IN SHARED CELLS

(71) Applicant: Telefonaktiebolaget LM Ericsson (publ), Stockholm (SE)

(72) Inventors: Leonard Lightstone, Ottawa (CA); Garry Irvine, Ottawa (CA); François Cardinal, Val-des-Monts (CA); Peter Pääkkönen, Stockholm (SE); Adrien Comeau, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days. days.

(21) Appl. No.: 15/318,024

(22) PCT Filed: Jun. 18, 2014

(86) PCT No.: PCT/IB2014/062388
§ 371 (c)(1),
(2) Date: Dec. 12, 2016

(87) PCT Pub. No.: WO2015/193704
PCT Pub. Date: Dec. 23, 2015

(65) Prior Publication Data
US 2017/0123042 A1 May 4, 2017

(51) Int. Cl.
*H04L 5/00* (2006.01)
*G01S 5/02* (2010.01)
(Continued)

(52) U.S. Cl.
CPC .......... *G01S 5/0252* (2013.01); *H04B 17/318* (2015.01); *H04L 5/0032* (2013.01);
(Continued)

(58) Field of Classification Search
CPC ......... H04W 64/00; H04B 17/318; H04L 5/00
(Continued)

(56) References Cited

U.S. PATENT DOCUMENTS

| 7,949,347 B1 | 5/2011 | Copeland |
| 2006/0075131 A1 | 4/2006 | Douglas et al. |

(Continued)

FOREIGN PATENT DOCUMENTS

| GB | 2424139 A | 9/2006 |
| WO | 2012075049 A1 | 6/2012 |

OTHER PUBLICATIONS

Parkvall, Stefan et al., "Heterogeneous network deployments in LTE," The soft-cell approach, Feb. 2011, Ericsson Review, 5 pages.
(Continued)

*Primary Examiner* — Michael T Vu
(74) *Attorney, Agent, or Firm* — Sage Patent Group

(57) ABSTRACT

Systems and methods for determining a location of a wireless device are disclosed. In one embodiment, a method of operation of a central processing node for a shared cell of a cellular communications network includes obtaining signal strength measurements for a signal received from a wireless device at multiple Reception/Transmission (R/T) points in the shared cell. The signal strength measurements are simultaneous signal strength measurements made on signal discrimination space resources in an uplink of the shared cell. Further, the signal discrimination space resources are matched to capabilities of power meters utilized to generate the signal strength measurements. The method further includes identifying one or more of the R/T points having the best signal strength measurements and estimating a location of the wireless device based on known locations of the identified R/T point(s).

32 Claims, 12 Drawing Sheets

(51) Int. Cl.
    *H04B 17/318*     (2015.01)
    *H04W 4/02*     (2018.01)
    *H04W 72/12*     (2009.01)
    *H04W 72/04*     (2009.01)
    *H04W 74/08*     (2009.01)
    *H04L 27/26*     (2006.01)

(52) U.S. Cl.
    CPC ........ *H04L 5/0048* (2013.01); *H04L 27/2607* (2013.01); *H04W 4/02* (2013.01); *H04W 72/0413* (2013.01); *H04W 72/0446* (2013.01); *H04W 72/0453* (2013.01); *H04W 72/1268* (2013.01); *H04W 72/1273* (2013.01); *H04W 74/0833* (2013.01)

(58) Field of Classification Search
    USPC .......................................... 455/456.1–456.5
    See application file for complete search history.

(56) References Cited

U.S. PATENT DOCUMENTS

2009/0082034 A1*   3/2009   Gray ..................... H04W 64/00
                                                                                                 455/456.1
2014/0200009 A1*   7/2014   Schier ................... H04W 64/00
                                                                                                 455/446

OTHER PUBLICATIONS

International Search Report and Written Opinion for International Patent Application No. PCT/IB2014/062388, dated Oct. 1, 2014, 12 pages.

* cited by examiner

METHOD, APPARATUSES AND SYSTEM FOR IMPROVED WIRELESS DEVICE LOCATION IN SHARED CELLS

This application is a 35 U.S.C. § 371 national phase filing of International Application No. PCT/IB2014/062388, filed Jun. 18, 2014, the disclosure of which is incorporated herein by reference in its entirety.

FIELD OF THE DISCLOSURE

The present disclosure relates to determining a location of a wireless device in a shared cell of a cellular communications network.

BACKGROUND

There are many potential applications that utilize the location of a User Equipment device (UE) in a cellular communications network. For instance, UE location determination is required for Emergency 911 (E911) services. Further, the UE location performance capabilities are mandated by the Federal Communications Commission (FCC). Also, there are many commercial and user applications that rely on knowledge of UE location. In addition to E911, commercial, and user applications, UE location can be utilized by a cellular communications network to improve spectral efficiency. In particular, spectral efficiency scheduling at a base station (e.g., an enhanced Node B (eNB)) allows for use of the same time and frequency radio resources for multiple UEs that are, due to their locations, isolated from a Radio Frequency (RF) perspective. For example, two UEs on different floors of the same building may be assigned the same time and frequency radio resources without concern for co-interference.

There are many existing technologies that can be employed to determine UE location. One well-known and often used technology is the Global Positioning System (GPS). Further, some cellular communications networks (e.g., 3$^{rd}$ Generation Partnership Program (3GPP) Long Term Evolution (LTE) and other Radio Access Technologies (RATs)) use a cell Identifier (ID), UE range either determined from uplink or downlink signals, etc. to determine the location of a UE. However, in many instances, these technologies suffer difficulties in indoor and shared cell environments and become less effective or ineffective for UE location purposes. In particular, a UE equipped with a GPS receiver will not have access to the GPS technology if the GPS receiver is turned off or the GPS receiver is not able to detect a sufficient number of GPS signals (e.g., as when located inside a building). Further, in a small cell, ranging becomes less effective if the range accuracy is on the order of the cell size of the small cell.

Thus, there is a need for systems and methods for determining the location of a UE that is particularly well-suited for small-cell, indoor environments.

SUMMARY

Systems and methods for determining a location of a wireless device are disclosed. In one embodiment, a method of operation of a central processing node for a shared cell of a cellular communications network is provided. The method includes obtaining signal strength measurements for a signal received from a wireless device (e.g., a User Equipment device (UE)) at multiple Reception/Transmission (R/T) points in a shared cell. The signal strength measurements are simultaneous signal strength measurements made on signal discrimination space resources in an uplink of the shared cell. Further, the signal discrimination space resources are matched to capabilities of power meters utilized to generate the signal strength measurements for the signal received from the wireless device at the R/T points in the shared cell. The method of operation of the central processing node further includes identifying one or more of the R/T points in the shared cell having the best signal strength measurements and estimating a location of the wireless device based on known locations of the one or more of R/T points in the shared cell having the best signal strength measurements. In this manner, the location of the wireless device is determined using technology that is effective in, e.g., a small-cell indoor environment.

In one embodiment, the signal discrimination space resources comprise time and frequency radio resources in a measurement subframe of the uplink of the shared cell, and only the wireless device is scheduled to transmit in the measurement subframe of the uplink of the shared cell. In another embodiment, the signal discrimination space resources comprise a data region of a measurement subframe of the uplink of the shared cell, and only the wireless device is scheduled to transmit in the data region of the measurement subframe of the uplink of the shared cell.

In one embodiment, identifying the one or more of the R/T points in the shared cell having the best signal strength measurements includes identifying one of the R/T points in the shared cell having the best signal strength measurement, and estimating the location of the wireless device includes estimating the location of the wireless device based on a known location of the one of the R/T points in the shared cell having the best signal strength measurement. In another embodiment, identifying the one or more of the R/T points in the shared cell having the best signal strength measurements includes identifying two or more of the R/T points in the shared cell having the best signal strength measurements, and estimating the location of the wireless device includes estimating the location of the wireless device based on known locations of the two or more of the R/T points in the shared cell having the best signal strength measurements.

In one embodiment, the capabilities of the power meters include the capability to measure power across an entire bandwidth of an uplink carrier of the shared cell, and the signal discrimination space resources include time and frequency radio resources within a period of time across the entire bandwidth of the uplink carrier of the shared cell. In another embodiment, the capabilities of the power meters include the capability to measure power across only a portion of a bandwidth of an uplink carrier of the shared cell, and the signal discrimination space resources include time and frequency radio resources within a period of time across the portion of the bandwidth of the uplink carrier of the shared cell. Further, in one embodiment, the method further includes scheduling uplink transmissions for one or more additional wireless devices during the time period within one or more other portions of the bandwidth of the uplink carrier. In one embodiment, the period of time is a measurement subframe in an uplink radio frame.

In one embodiment, a central processing node for a shared cell is provided. In one embodiment, the central processing node includes a processor and memory containing software executable by the processor whereby the central processing node is operative to obtain signal strength measurements for a signal received from a wireless device at corresponding R/T points in the shared cell. The signal strength measurements are simultaneous signal strength measurements made on signal discrimination space resources in an uplink of the shared cell. Further, the signal discrimination space resources are matched to capabilities of power meters utilized to generate the signal strength measurements for the signal received from the wireless device at the R/T points in the shared cell. Via the software executable by the processor, the central processing node is further operative to identify one or more of the R/T points in the shared cell having the best signal strength measurements for the signal received from the wireless device and estimate a location of the wireless device based on known locations of the one or more of the R/T points in the shared cell having the best signal strength measurements.

In another embodiment, the central processing node for the shared cell includes means for obtaining signal strength measurements for a signal received from the wireless device at corresponding R/T points in the shared cell. The plurality of signal strength measurements are simultaneous signal strength measurements made on signal discrimination space resources in an uplink of the shared cell. Further, the signal discrimination space resources are matched to capabilities of power meters utilized to generate the signal strength measurements for the signal received from the wireless device at the R/T points in the shared cell. The central processing node further includes means for identifying one or more of the R/T points in the shared cell having the best signal strength measurements for the signal received from the wireless device and means for estimating a location of the wireless device based on known locations of the one or more of the R/T points in the shared cell having the best signal strength measurements.

In one embodiment, a system for determining a location of a wireless device is provided. In one embodiment, the system includes multiple R/T points in a shared cell configured to receive a signal from the wireless device on signal discrimination space resources in an uplink of the shared cell. In addition, the system includes a central processing node configured to obtain signal strength measurements for the signal received from the wireless device at the R/T points in the shared cell. The signal strength measurements are simultaneous signal strength measurements made on the signal discrimination space resources in the uplink of the shared cell. Further, the signal discrimination space resources are matched to capabilities of power meters utilized to generate the signal strength measurements for the signal received from the wireless device at the R/T points in the shared cell. The central processing node is further configured to identify one or more of the R/T points in the shared cell having the best signal strength measurements for the signal received from the wireless device and estimate a location of the wireless device based on known locations of the one or more of the R/T points in the shared cell having the best signal strength measurements.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 illustrates a cellular communications network including a number of shared cells according to one embodiment of the present disclosure;

FIG. 2 graphically illustrates a process for determining a location of a wireless device within one of the shared cells of FIG. 1 according to one embodiment of the present disclosure;

Figure 1:
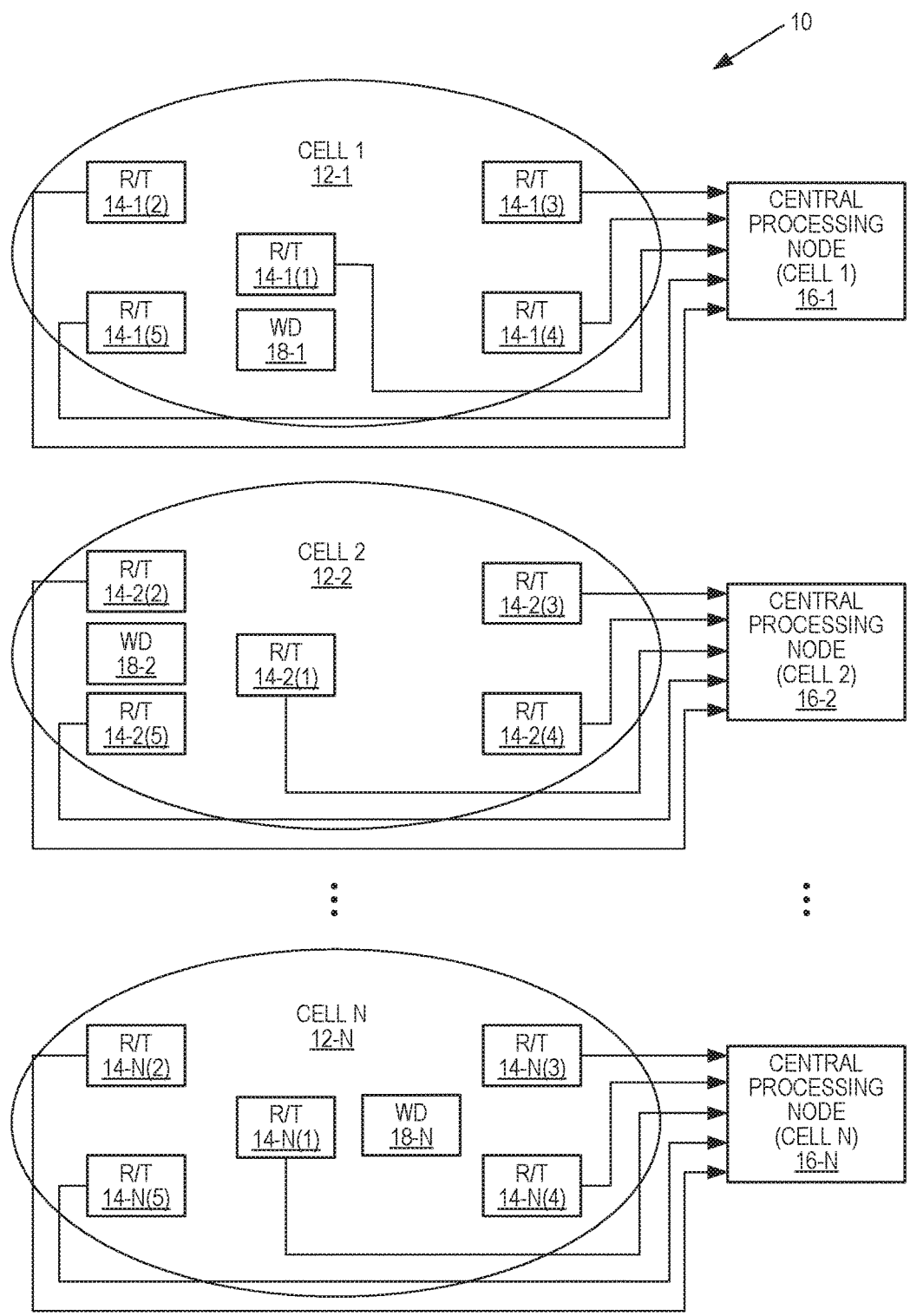
Figure 11:
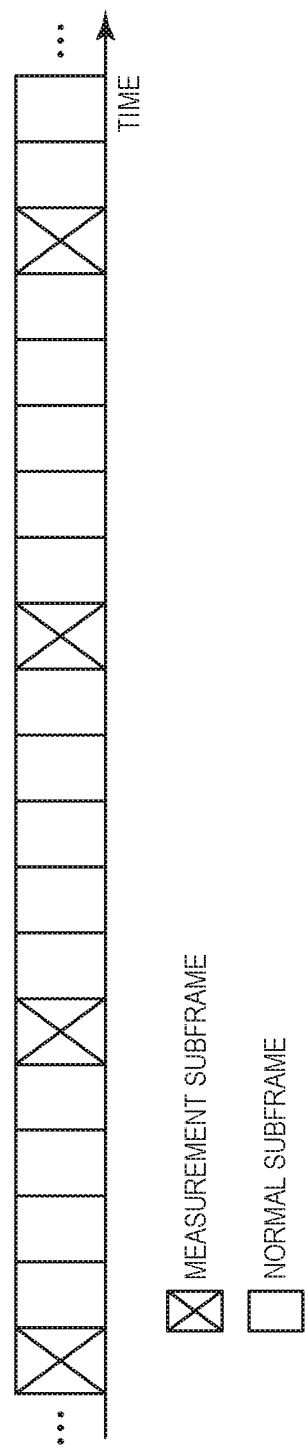
Figure 12:
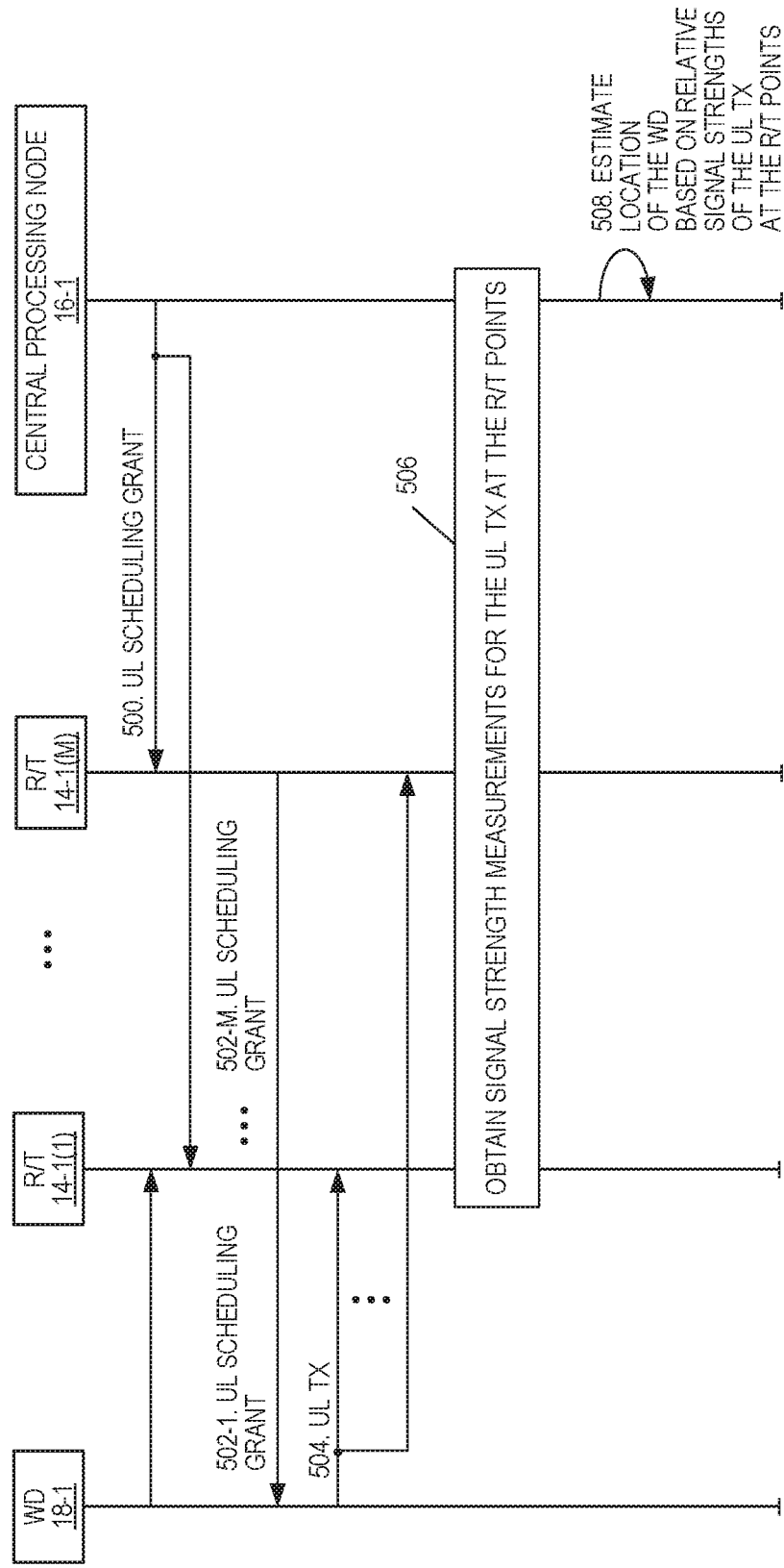

FIG. 11 illustrates a process for determining the location of a wireless device within one of the shared cells of FIG. 1 according to another embodiment of the present disclosure; and FIG. 12 illustrates the use of measurement subframes to obtain signal strength measurements for an uplink signal from a wireless device for multiple R/T points in a shared cell, where the signal strength measurements are utilized to determine a location of the wireless device within the shared cell according to one embodiment of the present disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods for determining a location of a wireless device in a shared cell of a cellular communications network are disclosed. While these embodiments are particularly well suited for a small-cell, indoor environment, they are not limited thereto. Further, in some embodiments, the cellular communications network is a $3^{rd}$ Generation Partnership Project (3GPP) Long Term Evolution (LTE) network and, as such, LTE terminology is oftentimes used throughout this disclosure. However, the concepts disclosed herein are not limited to LTE and may be applied to any suitable type of cellular communications network.

FIG. 1 illustrates one example of a cellular communications network 10 that provides wireless device (e.g., User Equipment device (UE)) location determination according to one embodiment of the present disclosure. As illustrated, the cellular communications network 10 includes a number of shared cells 12-1 through 12-N (generally referred to herein collectively as shared cells 12 and individually as shared cell 12). As used herein, a shared cell 12 (which is also sometimes referred to as a "same cell," a "merged cell," or a "soft cell") is one instantiation of a heterogeneous network where a number of Reception/Transmission (R/T) points share the same cell Identifier (ID) as well as cell specific signals such that, from a wireless device (e.g., UE) perspective, these smaller "cells" are seen as one effective cell. The shared cell approach avoids the proliferation of cell IDs. Shared cells also avoid the high signaling load that would occur if each R/T point was a stand-alone cell and required hand-off operations as wireless devices moved through the general coverage area. Also, depending on the separation that is maintained on the processing of signals to/from each R/T point, shared cell configurations may conserve processing power by avoiding the transmission/reception/processing of unique data streams for each R/T point.

The shared cell 12-1 includes a number of R/T points 14-1(1) through 14-1(5) providing radio access for the shared cell 12-1. The R/T points 14-1(1) through 14-1(5) (generally referred to herein collectively as R/T points 14-1 of the shared cell 12-1 and individually as R/T point 14-1 of the shared cell 12-1) each have their own coverage areas but collectively serve a larger coverage area (i.e., the shared cell 12-1) that is identified with a cell ID. Likewise, the shared cell 12-2 includes a number of R/T points 14-2(1) through 14-2(5) (generally referred to herein collectively as R/T points 14-2 of the shared cell 12-2 and individually as R/T point 14-2 of the shared cell 12-2) providing radio access for the shared cell 12-2, and the shared cell 12-N includes a number of R/T points 14-N(1) through 14-N(5) (generally referred to herein collectively as R/T points 14-N of the shared cell 12-N and individually as R/T point 14-N of the shared cell 12-N) providing radio access for the shared cell 12-N. The R/T points 14-1(1) through 14-1(5), 14-2(1) through 14-2(5), and 14-N(1) through 14-N(5) are generally referred to herein collectively as R/T points 14 and individually as R/T point 14. While each of the shared cells 12 is illustrated as having five R/T points 14 in the example of FIG. 1, each of the shared cells 12 may include any number of two or more R/T points 14. Also, the shared cells 12 may or may not have the same number of R/T points 14. As used herein, an R/T point 14 is any node that performs radio frequency (i.e., wireless) reception and transmission for the shared cell 12. In the preferred embodiments described herein, the shared cells 12 are small cells, where the spacing between the R/T points 14 within each shared cell 12 is relatively small. As one non-limiting example, the spacing between the R/T points 14 within each of the shared cells 12 is less than or equal to 25 meters (m). Further, the locations of the R/T points 14 are known.

The shared cells 12-1 through 12-N have corresponding central processing nodes 16-1 through 16-N (generally referred to herein collectively as central processing nodes 16 and individually as central processing node 16). In a heterogeneous network deployment, the central processing node 16 may be, e.g., an associated macro base station (e.g., an enhanced or evolved Node B (eNB) in 3GPP LTE) serving a macro cell in which the shared cell 12 is located. The central processing nodes 16 generally operate to, e.g., schedule uplink and downlink transmissions in the shared cells 12, combine and process uplink transmissions received from wireless devices via the R/T points 14 in the corresponding shared cell 12, etc. Note that while each shared cell 12 is illustrated as having its own central processing node 16, in some embodiments, a single central processing node 16 may perform centralized processing for two or more and potentially all of the shared cells 12.

The R/T points 14-1 for the shared cell 12-1 provide radio access to wireless devices, such as wireless device 18-1, located within the shared cell 12-1. Note that wireless devices may also be referred to as, e.g., wireless terminals, mobile terminals, UEs, etc. Likewise, the R/T points 14-2 for the shared cell 12-2 provide radio access to wireless devices, such as wireless device 18-2, located within the shared cell 12-2, and the R/T points 14-N for the shared cell 14-N provide radio access to wireless devices, such as wireless device 18-N, located within the shared cell 12-N. The wireless devices 18-1 through 18-N are generally referred to herein collectively as wireless devices 18 and individually as wireless device 18. A wireless device 18 connected to a shared cell 12 does not distinguish between different R/T points 14. However, the central processing node 16 for the shared cell 12 may distinguish the R/T point 14 for the uplink signals based on the branch on which the uplink signals appear, provided that separate lines for each R/T point 14 are maintained. When transmitting a downlink signal to, e.g., the wireless device 18-1, the central processing node 16-1 controls the R/T points 14-1 or some subset of the R/T points 14-1 (if sufficient Radio Frequency (RF) isolation exists between regions within the shared cell 12-1 and/or if information is scheduled over the air so as to avoid a wireless device 18 receiving conflicting, non-resolvable information) in the shared cell 12-1 such that the R/T points 14-1 simultaneously transmit the downlink signal to the wireless device 18-1. Conversely, when, e.g., the wireless device 18-1 transmits an uplink signal, the uplink signal is received by all of the R/T points 14-1 or at least a subset of the R/T points 14-1. The corresponding received signals are combined and processed by the central processing node 16-1 to provide a final received signal from the wireless device 18-1.

With regard to location determination, when location determination technologies at, e.g., the wireless device 18-1 are unavailable (e.g., Global Positioning System (GPS) is unavailable) and assuming that the shared cell 12-1 is a small cell, using 3GPP LTE as an example, sub-shared cell wireless device location determination is only crudely possible, if at all, when using conventional technologies, e.g., Observed Time Difference of Arrival (OTDOA) and Uplink Time Difference of Arrival (UTDOA). Basic resolution of wireless device location at the cell ID level is what can be expected. In particular, OTDOA and UTDOA type location determination technologies cannot be considered to be generally applicable because: (a) the position reference symbols from an outdoor macro cell used for OTDOA and UTDOA may be very weak in an indoor environment (e.g., inside a building), (b) it is quite likely that a wireless device will not receive at least three signals for triangulation from well oriented outdoor R/T points (with respect to position determination) when the wireless device is indoors, and (c) ranging information from a shared cell itself is of marginal use, particularly when the shared cell is implemented in an indoor environment.

Figure 2:
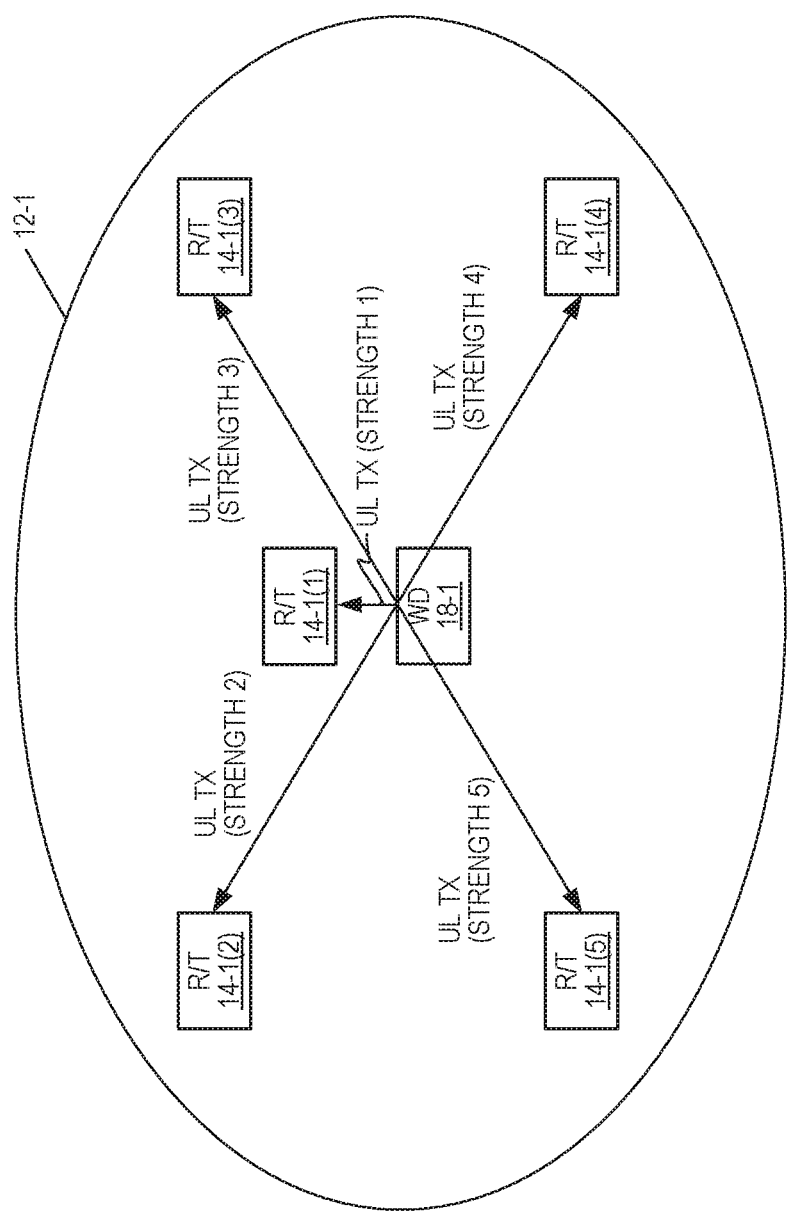

As discussed below in detail, relative signal strengths at the R/T points 14-1 for an uplink signal transmitted by, e.g., the wireless device 18-1 can be analyzed to estimate the location, or position, of the wireless device 18-1. More specifically, as illustrated in FIG. 2, using the wireless device 18-1 and the shared cell 12-1 as an example, the location of the wireless device 18-1 is estimated based on signal strength measurements for a signal transmitted by the wireless device 18-1 at the R/T points 14-1 of the shared cell 12-1. As discussed below in detail, the R/T point(s) 14-1 having the best received signal strength(s) for the uplink signal transmitted by the wireless device 18-1 is (are) identified. Here, the "best" received signal(s) generally refer to the strongest received signal(s) relative to the signal(s) received at the other R/T point(s) 14-1 in the shared cell 12-1. Since the signal strengths can be time varying due to, e.g., propagation effects, etc., suitable evaluation of the signal over time (e.g., averaging) is preferably performed in order to produce a high confidence assessment of the strongest signals and a ranking of relative strength of the signals received at the other R/T points.

In the example of FIG. 2, the R/T point 14-1(1) has the best received signal strength. The location of the wireless device 18-1 is then estimated based on a known location of the identified R/T point 14-1(1). As also discussed below, in some embodiments, clustering techniques may be used to interpolate the location of the wireless device 18-1 based on the known locations of multiple R/T points 14-1 having the best, or strongest, signal strengths (e.g., the best, or strongest, N signal strength values among the R/T points 14-1, where N is an integer greater than or equal to 1 or greater than or equal to 2). For instance, in this example, the three best signal strengths may be measured for R/T points 14-1(1), 14-1(4), and 14-1(5). The location of the wireless device 18-1 may then be interpolated from the known locations of the R/T points 14-1(1), 14-1(4), and 14-1(5).

Also, in some embodiments, a scheduler for the shared cell 12-1, which may be implemented in the central processing node 16-1 for the shared cell 12-1, utilizes one or more techniques to improve the signal strength measurements for the uplink signal from the wireless device 18-1 for the R/T points 14-1. More specifically, in one embodiment, the scheduler for the shared cell 12-1 operates to schedule the uplink transmission from the wireless device 18-1 in such a manner that the signal strength measurements for the R/T points 14-1 can be made on signal discrimination space resources (e.g., time and frequency radio resources) such that interference from other transmissions within the shared cell 12-1 and/or within neighboring cell(s) of the shared cell 12-1 are avoided. In this manner, power contributions from uplink transmissions from other wireless devices 18 in the shared cell 12-1 to the signal strength measurements for the wireless device 18-1 can be minimized or avoided. Further, Inter-Cell Interference Coordination (ICIC) techniques and/or interference cancellation techniques may be used to minimize or avoid power contributions from uplink transmissions from wireless devices 18 in adjacent, or neighboring, cells (in the RF sense).

Importantly, the uplink signal from the wireless device 18-1 used for the signal strength measurements for the R/T points 14-1 is transmitted in a signal discrimination space. As used herein, a signal discrimination space is any (quasi) orthogonal space where the signal from the wireless device 18-1 can be separated from signals transmitted from other wireless devices (at least from other wireless devices in the same shared cell 12-1). Time and frequency radio resources are examples of such spaces for LTE. Wideband Code Division Multiple Access (WCDMA) uses time and orthogonal codes to separate the multiple users. Thus, while time and frequency radio resources are discussed below, it is to be understood that any signal discrimination space can be used and that time and frequency radio resources are only an example.

Figure 3:
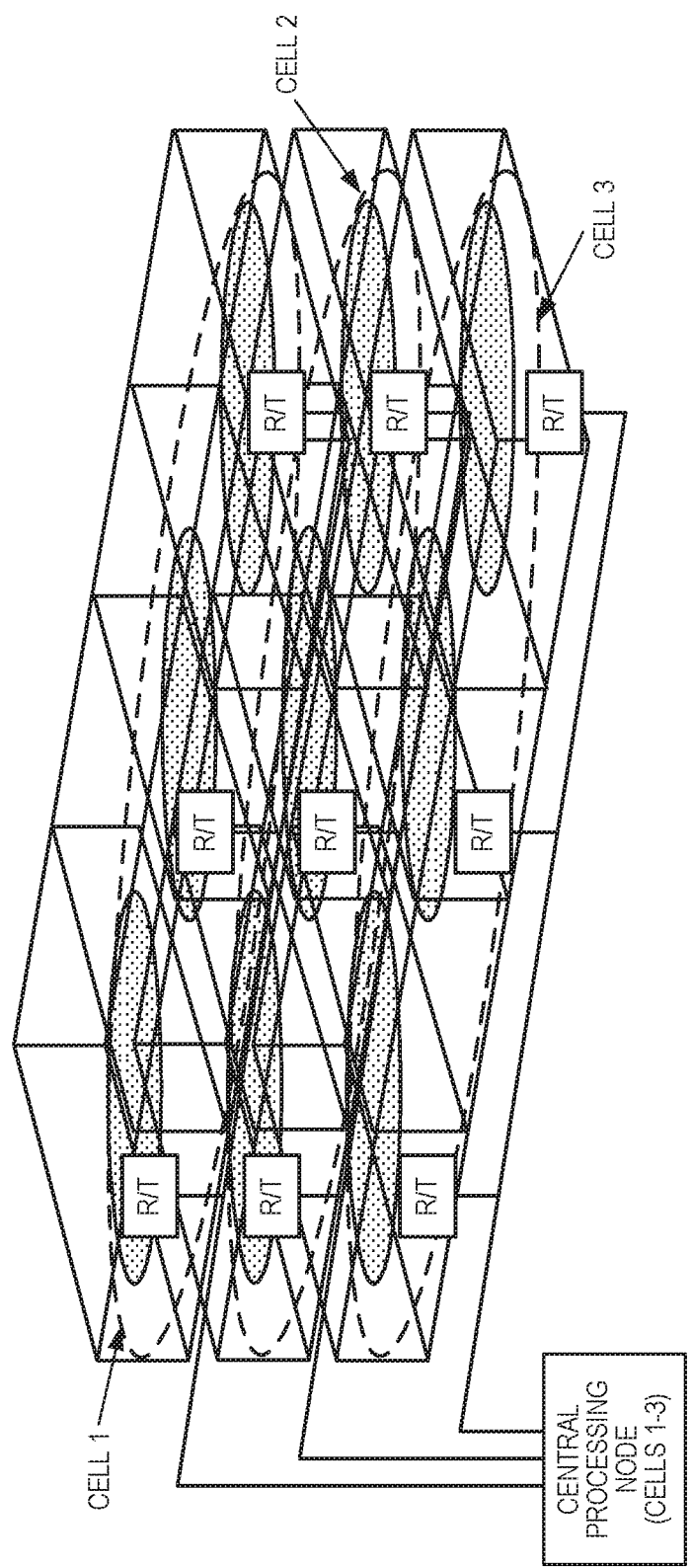
FIG. 3 illustrates one example implementation of the shared cells of FIG. 1 within an indoor environment.

Before describing embodiments of the location determination process in more detail, it should be noted again that the embodiments described herein are generally applicable to any shared-cell configuration. However, some preferred embodiments, the shared cells 12 are shared cells 12 in which the R/T points 14 are closely spaced. This may be beneficial to, for example, meet the Federal Communications Commission (FCC) requirement of 50 m accuracy for location determination for a wireless device in a cellular communications network. In particular, shared cells 12 within an indoor environment (e.g., inside a building) where spacing between the R/T points 14 is small (e.g., less than 25 m) and penetration of external RF signals (e.g., from other cells, other Radio Access Technologies (RATs), and/or GPS systems) is poor are particularly of interest. One example implementation of the cellular communications network 10 in such an environment is illustrated in FIG. 3. In this example, each shared cell 12 is implemented on a different floor of a building, and the shared cells 12 have a single central processing node 16. In such an indoor configuration, the R/T points 14 are separated by a distance on the order of, e.g., approximately 24 m, but the actual distances will be dependent on the specifics of the RF behavior and room layout in the particular building. Therefore, in a typical situation, a wireless device, e.g., the wireless device 18-1, within the building will be 0 to 12 m from the closest R/T point 14. Given this configuration, the ability to determine the location of the wireless device 18-1 to the nearest one or few R/T points 14-1 can be expected to meet the FCC location requirement of ±50 m in the majority of cases.

Figure 4:
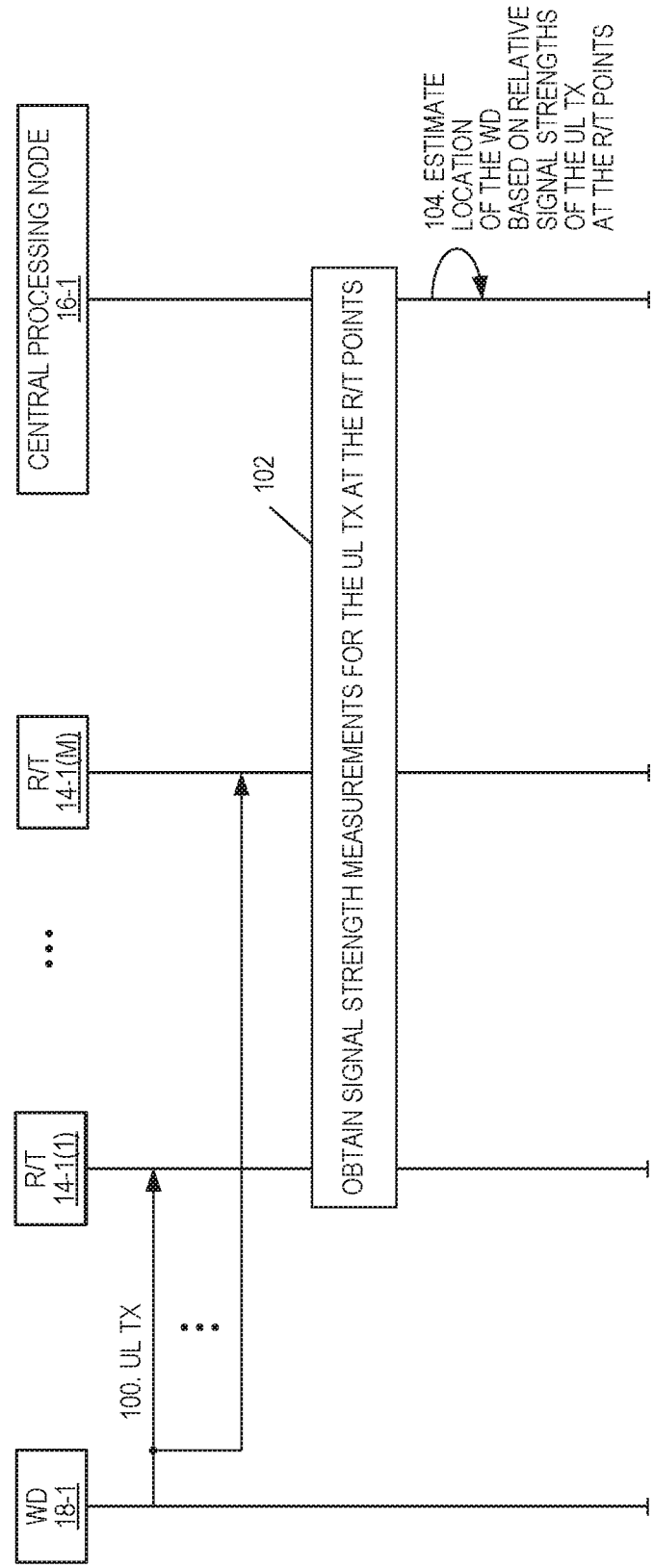
FIG. 4 illustrates a process for determining the location of a wireless device within one of the shared cells of FIG. 1 according to one embodiment of the present disclosure.

FIG. 4 illustrates the operation of the shared cell 12-1 to determine the location of the wireless device 18-1 according to one embodiment of the present disclosure. This discussion also applies to the other shared cells 12. As illustrated, the wireless device 18-1 transmits an uplink signal (step 100). The uplink signal from the wireless device 18-1 may be any wireless device specific signal such as, for example, a shared channel transmission, a pilot signal transmission, a Physical Uplink Control Channel (PUCCH) signal transmission, a Sounding Reference Signal (SRS) transmission, a Physical Random Access Channel (PRACH) transmission (if the PRACH transmission can be uniquely associated with the specific wireless device 18-1), or any future signal that may be introduced over time (e.g., via future standard evolutions). As discussed below, in some embodiments, the transmission of the uplink signal by the wireless device 18-1 is scheduled in such a way that any power contributions detected in the power meter due to uplink transmissions from other wireless devices 18 in the shared cell 12 and, in some embodiments, uplink transmission from other wireless devices 18 in neighboring cell(s) is minimized or at least negligible with respect to determining the location of the wireless device 18-1 to within a desired degree of accuracy (e.g., ±50 m).

The uplink signal from the wireless device 18-1 is received by the R/T points 14-1 in the shared cell 12-1 and simultaneous measurements of the signal strength of the uplink signal received at the R/T points 14-1 are obtained (step 102). Note that, in some embodiments, all of the R/T points 14-1 receive the uplink signal. However, in other embodiments, the uplink signal may be received by only a subset of the R/T points 14-1, where this subset can be two or more of the group of all of the R/T points 14-1 in the shared cell 12-1.

In one embodiment, the R/T point 14-1(1) measures the signal strength of the uplink signal at the R/T point 14-1(1) and provides the measurement of the signal strength to the central processing node 16-1. In the same manner, the other R/T points 14-1 measure the signal strength of the uplink signal at the R/T points 14-1 and provide the resulting measurements of the signal strength to the central processing node 16-1. In another embodiment, the R/T points 14-1 provide the received signals (possibly frequency translated to Intermediate Frequency (IF) or Baseband (BB) and, in some embodiments, digitized) to the central processing node 16-1, where the central processing node 16-1 then generates measurements for the uplink signal from the wireless device 18-1 received at the R/T points 14-1.

For each R/T point 14-1, the measurement of the received signal strength at the R/T point 14-1 is a combined (e.g., averaged) or otherwise processed measurement of the received signal strength at the R/T point 14-1. For instance, in one embodiment, the measurement of the received signal strength at a particular R/T point 14-1 may be the measurement of the average received signal strength or a maximum value of the received signal strength at the R/T point 14-1 for the uplink signal from the wireless device 18-1 over a defined period of time (e.g., a subframe). In other embodiments, the measurement of the signal strength at the R/T point 14-1 may be obtained over multiple time periods (e.g., multiple subframes) in which the uplink signal(s) is (are) transmitted by the wireless device 18-1. For instance, the signal strength may be averaged over multiple subframes to provide the measurement of the signal strength at the R/T point 14-1, a maximum value of the signal strength over multiple subframes may be extracted and provided as the measurement of the signal strength at the R/T point 14-1, or the like. Such multi-sample processing may improve the reliability of the relative signal strength assessment. For example, a voice call typically has an average packet rate of 50 packets per second thereby providing up to 50 subframes per second over which data can be averaged (and potentially more if Hybrid Automatic Repeat Request (HARQ) retransmissions are included in the averaging). Averaging may be done in a series of bursts to account for "fast" pedestrian traffic (i.e., running) which could occur in emergency situations associated with 911. A fast sprint is about 15 miles per hour, or about 6.7 meters per second (m/s), suggesting that averaging bursts of one second duration is reasonable when R/T point 14 spacing is around 24 m.

As mentioned above, in some embodiments, transmission of the uplink signal by the wireless device 18-1 is scheduled in such a way that any power contributions due to uplink transmissions from other wireless devices 18 in the shared cell 12 and, in some embodiments, uplink transmissions from other wireless devices 18 in neighboring cell(s) is minimized or at least negligible with respect to determining the location of the wireless device 18-1 to within a desired degree of accuracy (e.g., ±50 m). More specifically, in one embodiment, power meters having limited time and/or frequency capabilities are utilized to obtain the signal strength measurements for the R/T points 14-1. As discussed below, the power meters may be implemented at any point in the receive chain prior to combining the received signals from the R/T points 14-1. For example, the power meters may be implemented prior to RF processing of the received uplink signal at the R/T points 14-1. When using limited capability power meters, in some embodiments, the transmission of the uplink signal is scheduled such that the time and frequency resources (or more generally the signal discrimination space resources) used for the uplink transmission from the wireless device 18-1 match the time and frequency discrimination capabilities of the power meters. Further, the uplink transmission is scheduled such that power contributions from other wireless devices 18 in the shared cell 12-1 and, in some embodiments, in any neighboring cells are reduced, minimized, or avoided in the time and frequency resources (or more generally the signal discrimination space resources) in which the uplink signal from the wireless device 18-1 is transmitted and measured by the power meters. In this manner, the signal strength measurements can be isolated with low complexity.

These cooperative scheduling schemes provide isolation of the uplink signal and thus the corresponding signal strength measurements. This, in turn, enables the use of simple power detection techniques (i.e., the power meters) to detect the signal strength of the received signal at the R/T points 14-1. These simple power detection techniques can be used early in the receive chain (e.g., at RF) and therefore do not overly restrict the summing between antenna signals. The result is a commensurate reduction in receiver complexity as desired for a shared cell implementation.

In addition or alternatively, in some embodiments, transmission of the uplink signal by the wireless device 18-1 is scheduled in such a way as to obtain best possible measurements of the received signal strength at the R/T points 14-1. For example, this scheduling may include locating the optimal, or best, uplink frequencies to be used for the uplink transmission or conducting frequency sweeps across the uplink carrier to obtain wideband results. When using limited capability power meters to obtain the signal strength measurements, this scheduling may be particularly beneficial in an embodiment where a frequency band of the power meters is configurable (e.g., 1-4 MHz bandwidth having a tunable center frequency).

Once the signal strength measurements are obtained, the central processing node 16-1 estimates the location of the wireless device 18-1 based on the relative signal strengths of the uplink signal at the R/T points 14-1 (step 104). More specifically, based on the relative signal strengths, the wireless device 18-1 is associated with one of the R/T points 14-1 for which the best signal strength was measured or a group of two or more R/T points 14-1 for which the best signal strengths were measured. Then, the location of the wireless device 18-1 is estimated based on the known location(s) of the R/T point(s) 14-1 for which the best signal strength(s) was (were) measured.

Note that, typically, in a cellular communications network 10, received amplitude, or signal strength, is not used as an indicator of location for several reasons. First, the amplitude, or signal strength, continuously varies in time, location, and across frequency depending on propagation conditions. As such, it is impossible, or at least very difficult, to associate a signal strength with a specific distance or location. Second, the uplink signal strength is power controlled in an attempt to hold the received signal power constant regardless of the location of the wireless device 18-1. Finally, ranging information in macro cells, or the cell ID in combination with cell location in pico cells, provides better accuracy than any indications from received signal strength.

However, the shared cell configuration is unique in that the different, spatially separate R/T points 14-1 within the shared cell 12-1 simultaneously receive the uplink signal from the wireless device 18-1. The closer the wireless device 18-1 is to any R/T point 14-1, the stronger the signal strength at that R/T point 14-1. Therefore, any comparison of the simultaneous measurements of the signal strength at the R/T points 14-1 will indicate the relative proximity of the wireless device 18-1 to each member in that set of R/T points 14-1. Furthermore, when the R/T points 14-1 are closely spaced, excellent location accuracy is obtained purely through association of the wireless device 18-1 with the R/T point(s) 14-1 indicating the strongest received signal.

Figure 5:
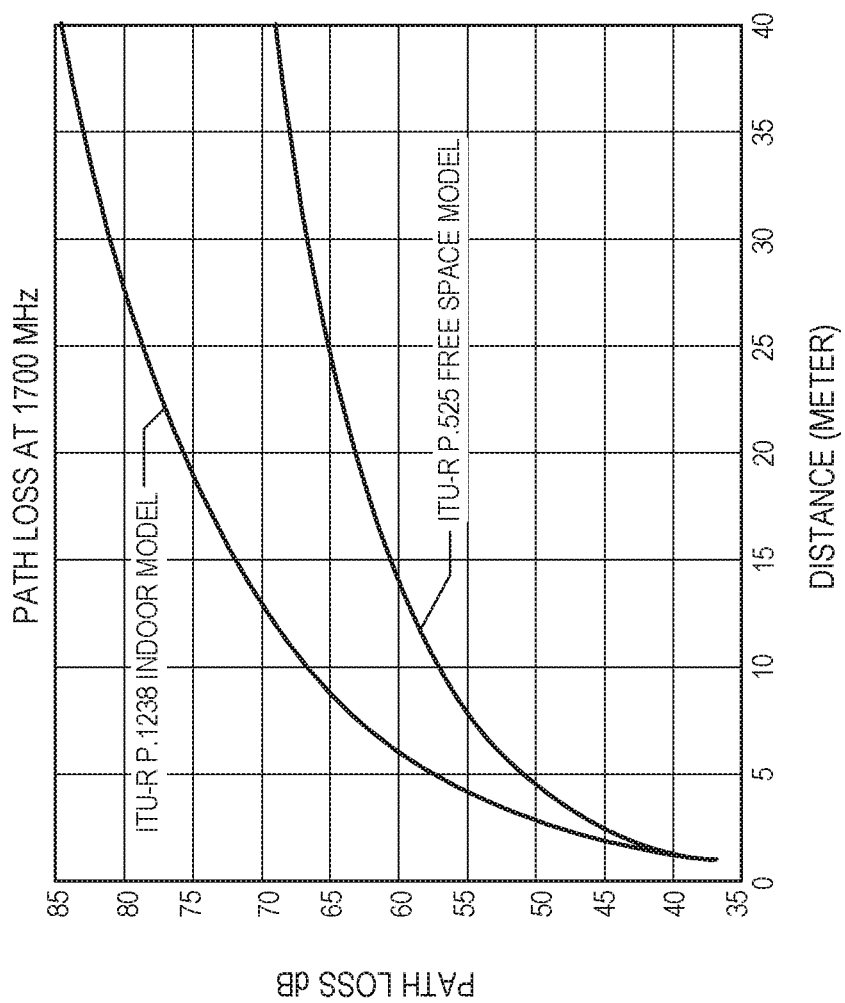
FIG. 5 illustrates a typical path loss versus distance curve.

FIG. 5 shows a typical path loss versus distance curve. The slope of path loss versus distance is more pronounced indoor versus free space. In the 5-10 m region, the loss rate is about 2 Decibels (dB) per meter. In the 10-20 m region, the loss rate is about 1 dB per meter. The strong dependence of path loss in these near-in regions is advantageous to the sensitivity of the signal strength based location techniques described herein. The path loss and rate of change of path loss are weakly dependent on frequency over the range of frequencies of interest, but are more strongly dependent on the nature of the indoor space (e.g., office, commercial, etc.).

Figure 6:
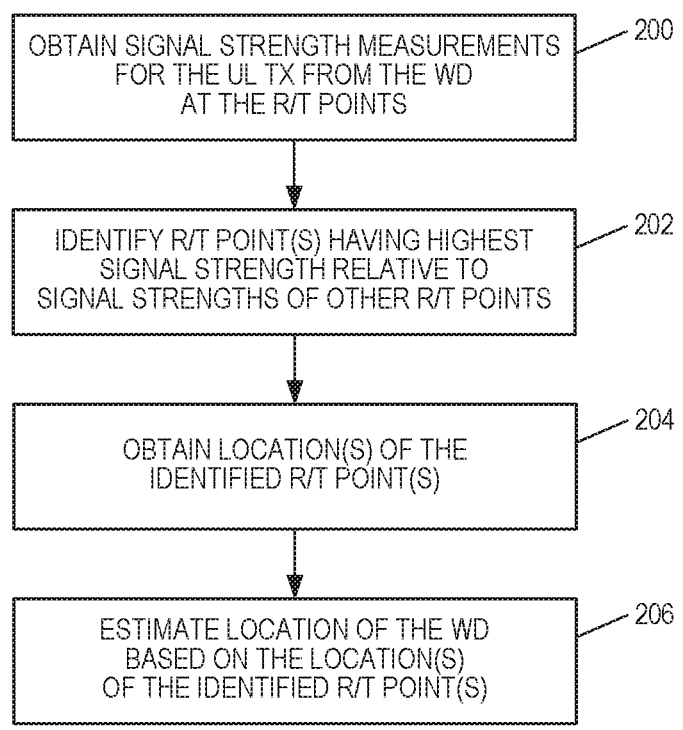
FIG. 6 is a flow chart that illustrates the operation of a central processing node of a shared cell to determine the location of a wireless device in the shared cell according to one embodiment of the present disclosure.

FIG. 6 is a flow chart that illustrates the operation of the central processing node 16-1 to determine the location of the wireless device 18-1 according to one embodiment of the present disclosure. As discussed above, the central processing node 16-1 obtains the simultaneous measurements of the signal strength for an uplink signal transmitted by the wireless device 18-1 at the R/T points 14-1, or at least some of the R/T points 14-1, in the shared cell 12-1 (step 200). The central processing node 16-1 identifies the R/T point(s) 14-1 having the best signal strength measurement(s) relative to the signal strength measurements of the other R/T points 14-1 (step 202). The central processing node 16-1 then obtains the location(s) of the identified R/T point(s) 14-1 (step 204) and estimates the location of the wireless device 18-1 based on the location(s) of the identified R/T point(s) 14-1 (step 206).

More specifically, in one embodiment, the central processing node 16-1 identifies the single R/T point 14-1 having the best signal strength measurement. The location of the wireless device 18-1 can then be estimated as, e.g., the known location of the R/T point 14-1 or some location within the coverage area of the R/T point 14-1. In another embodiment, the central processing node 16-1 identifies a cluster of one or more, but possibly two or more, R/T points 14-1 having the best signal strength measurements. The central processing node 16-1 then utilizes any suitable clustering or interpolation technique to interpolate the location of the wireless device 18-1 based on the known locations of the identified R/T points 14-1 and their relative signal strengths. In other words, any suitable clustering technique can be utilized to determine a most probable location of the wireless device 18-1 within the coverage areas of the cluster of R/T points 14-1. If the shared cell 12-1 is in an indoor environment and the indoor propagation environment is such that there are locations where the physical proximity of a wireless device 18 (e.g., the wireless device 18-1) to an R/T point 14-1 and received RF signal strength are strongly misaligned, training of clustering software can be used to improve the location estimation performance. The training can be accomplished by technician walk-throughs and performed as part of the installation process. However, it is also likely that as part of the R/T point 14 installation process care will be taken to place R/T points 14 so as to avoid accentuating the effects of RF propagation anomalies.

As one simple example, consider a situation where there are 10 R/T points 14-1 in the shared cell 12-1. The received signal strength (or received powers) from the wireless device 18-1 of interest as measured for each of the 10 R/T points 14-1 is given by the set {P1, P2, . . . , P10}. Next, the received powers are ranked in order of strength from strongest to weakest: {P4, P3, P5, . . . , P7}. The central processing node 16-1 can deduce that the wireless device 18-1 is closest to the fourth R/T point 14-1, or possibly between the fourth and the third R/T points 14-1 depending on the value of the signal strength difference as measured at these R/T points 14-1.

Figure 7:
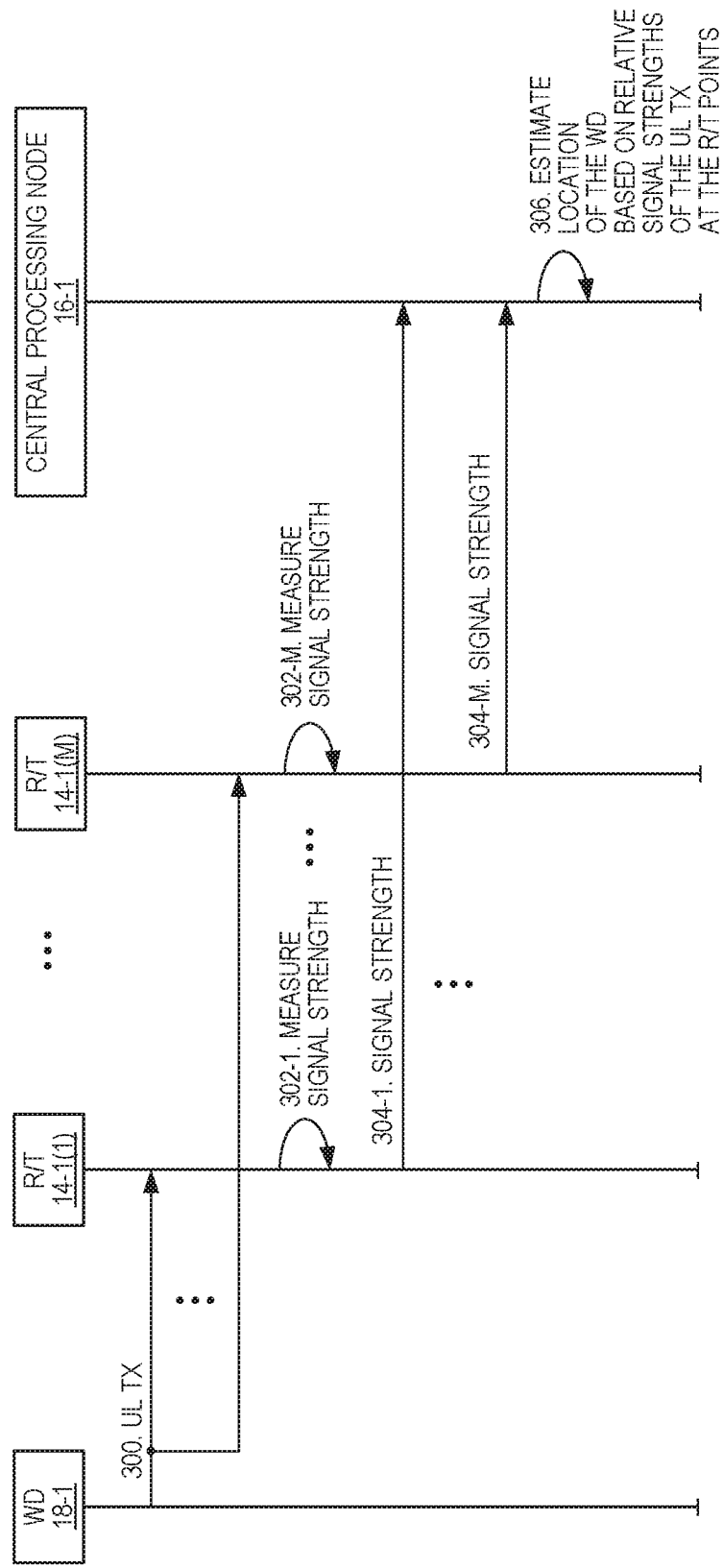
FIG. 7 illustrates a process for determining the location of a wireless device within one of the shared cells of FIG. 1 according to another embodiment of the present disclosure.

As discussed above, the signal strength measurements for the signal transmitted by the wireless device 18-1 received at the R/T points 14-1 in the shared cell 12-1 can be measured at the R/T points 14-1 or at the central processing node 16-1 based on the signals received by the R/T points 14-1. In this regard, FIG. 7 illustrates the operation of the shared cell 12-1 to determine the location of the wireless device 18-1 according to one embodiment of the present disclosure in which the signal strength measurements are made at the R/T points 14-1. This discussion also applies to the other shared cells 12. The embodiment of FIG. 7 is similar to that of FIG. 4. As such, some of the details are not repeated for conciseness.

As illustrated, the wireless device 18-1 transmits an uplink signal (step 300). Again, the uplink signal from the wireless device 18-1 may be any wireless device specific signal such as, for example, a shared channel transmission, a pilot signal transmission, a PUCCH signal transmission, an SRS transmission, a PRACH transmission (if the PRACH transmission can be uniquely associated with the specific wireless device 18-1), or any future signal that may be introduced over time (e.g., via future standard evolutions). In some embodiments, the transmission of the uplink signal by the wireless device 18-1 is scheduled in such a way that any power contributions due to uplink transmissions from other wireless devices 18 in the shared cell 12-1 and, in some embodiments, uplink transmissions from other wireless devices 18 in neighboring cell(s) is minimized or at least negligible with respect to determining the location of the wireless device 18-1 to within a desired degree of accuracy (e.g., ±50 m).

The uplink signal from the wireless device 18-1 is received by the R/T points 14-1 in the shared cell 12-1, and the R/T points 14-1 perform simultaneous measurements of the signal strength of the uplink signal received at the R/T points 14-1 (step 302-1 through 302-M). Here, "M" is the number of R/T points 14-1 in the shared cell 12-1, which in the example of FIG. 1 is five. Note that, in some embodiments, all of the R/T points 14-1 receive the uplink signal and make corresponding signal strength measurements. However, in other embodiments, the uplink signal may be received by only a subset of the R/T points 14-1, where this subset is one or more or possibly two or more of the group of all of the R/T points 14-1 in the shared cell 12-1. The R/T points 14-1 provide the measurements of the signal strength of the uplink signal at the R/T points 14-1 to the central processing node 16-1 (steps 304-1 through 304-M). As discussed above, for each R/T point 14-1, the measurement of the received signal strength at the R/T point 14-1 is a combined (e.g., averaged) or otherwise processed measurement of the received signal strength at the R/T point 14-1.

Once the signal strength measurements are received at the central processing node 16-1, the central processing node 16-1 estimates the location of the wireless device 18-1 based on the relative signal strengths of the uplink signal at the R/T points 14-1 (step 306). More specifically, based on the relative signal strengths, the wireless device 18-1 is associated with one of the R/T points 14-1 for which the best signal strength was measured or a group of two or more R/T points 14-1 for which the best signal strengths were measured. Then, the location of the wireless device 18-1 is estimated based on the known locations of the R/T point(s) 14-1 for which the best signal strength(s) was (were) measured, as discussed above.

Figure 8:
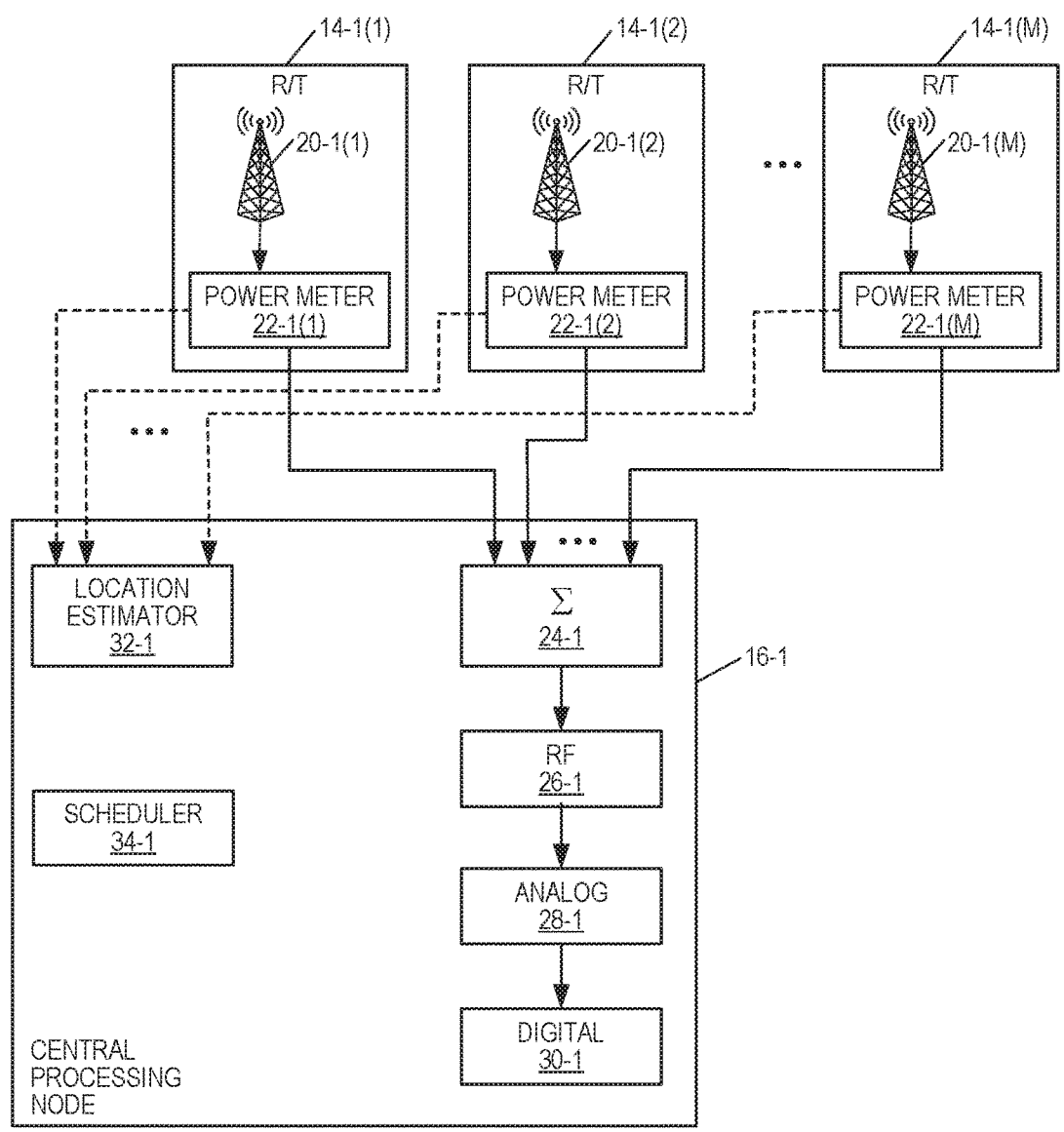
FIG. 8 is a block diagram that illustrates Reception/Transmission (R/T) points and a central processing node for a shared cell according to one embodiment of the present disclosure.

FIG. 8 is a block diagram illustrating the R/T points 14-1 of the shared cell 12-1 and the corresponding central processing node 16-1 according to one embodiment of the present disclosure. This discussion is equally applicable to the R/T points 14 and the central processing node(s) 16 of the other shared cells 12. In this embodiment, the signal strength measurements are made at RF at the R/T points 14-1. However, this is only an example. The signal strength measurements may be made anywhere in the receive chain (i.e., either in the R/T points 14-1 or in the central processing node 16-1 and at RF, IF, or BB) prior to summing of the signals from the R/T points 14-1.

As illustrated, the R/T points 14-1(1) through 14-1(M) in the shared cell 12-1 include antenna units 20-1(1) through 20-1(M) and power meters 22-1(1) through 20-1(M), respectively. The antenna units 20-1(1) through 20-1(M) are generally referred to herein collectively as antenna units 20-1 of the shared cell 12-1 or individually as antenna unit 20-1 of the shared cell 12-1. Likewise, the power meters 22-1(1) through 22-1(M) are generally referred to herein collectively as power meters 22-1 of the shared cell 12-1 and individually as power meter 22-1 of the shared cell 12-1. The central processing node 16-1 includes a summation component 24-1, an RF component 26-1, an analog component 28-1, a digital component 30-1, a location estimator 32-1, and a scheduler 34-1, each of which may be implemented in hardware, software, or a combination of hardware and software. For example, the location estimator 32-1 and/or the scheduler 34-1 may be implemented in software stored on a computer readable medium (e.g., a non-transitory computer readable medium such as, for example, memory) that when executed by a processor causes the processor to perform the functionality of the location estimator 32-1 and/or the scheduler 34-1 as described herein. Further, some of the components 24-1 through 34-1 may be implemented in a single physical component (e.g., the RF and analog components 26-1 and 28-1 may be implemented in a single integrated circuit).

In operation, when the wireless device 18-1 transmits an uplink signal to be used for location estimation, the uplink signal is received at the R/T points 14-1 via the corresponding antenna units 20-1. The power meters 22-1 simultaneously measure the signal strength of the uplink signal at the corresponding R/T points 14-1 to provide resulting signal strength measurements to the central processing node 16-1 via separate physical or logical channels. The power meters 22-1 have some signal processing measurement resolution capability that, generally, is less complete than the capability in the full receiver chain. In other words, the power meters 22-1 have limited capabilities in time and/or frequency. The measurement resolution capability of the power meters 22-1 may range from basic time and frequency filtering to very limited time isolation. The power meters 22-1 may be controllable (e.g., by the central processing node 16-1), or may use a static configuration. In each case, in some embodiments, the transmission of the uplink signal by the wireless device 18-1 of interest is scheduled to actively coordinate the transmission of the uplink signal by the wireless device 18-1 of interest so as to appropriately match the time and frequency resources used for the uplink transmission by the wireless device 18-1 and the measurement resolution capability of the power meters 22-1. Further, in some embodiments, the transmission of the uplink signal by the wireless device 18-1 of interest and uplink transmissions from other wireless devices 18 in the shared cell 12-1 and, in some embodiments, neighboring cell(s) are coordinates so as to reduce, minimize, or avoid power contributions from other transmissions from degrading the accuracy of the signal strength measurements for the uplink signal from the wireless device 18-1.

At the central processing node 16-1, the location estimator 32-1 operates to estimate the location of the wireless device 18-1 of interest based on the signal strength measurements received from the R/T points 14-1 in the manner described herein. Note that, in one embodiment, any combining (e.g., averaging) or post-processing of signal strength measurements over one or more time periods may be performed by the power meters 22-1 or performed by the location estimator 32-1. For example, in one embodiment, the power meters 22-1 average signal strength measurements over one subframe or multiple subframes and provide the resulting (average) signal strength measurement to the central processing node 16-1. However, in another embodiment, the power meters 22-1 provide signal strength measurements to the central processing node 16-1, and the location estimator 32-1 averages the signal strength measurements per R/T point 14-1 to provide the (average) signal strength measurement for the R/T points 14-1 that is used for location determination.

In addition, the uplink signal received at each of the R/T points 14-1 is passed from the R/T points 14-1 to the central processing node 16-1. The received signals are, in this embodiment, summed by the summation component 24-1 to provide a combined signal. The combined signal is processed by the RF component 26-1, the analog component 28-1, and the digital component 30-1 to provide a digital (BB) representation of the received uplink signal from the wireless device 18-1 using known processing techniques. While the summation component 24-1 is, in this embodiment, prior to the RF component 26-1, the summation component 24-1 may alternatively be implemented at any point in the receive chain (e.g., between the RF and analog components 26-1 and 28-1).

Figure 9:
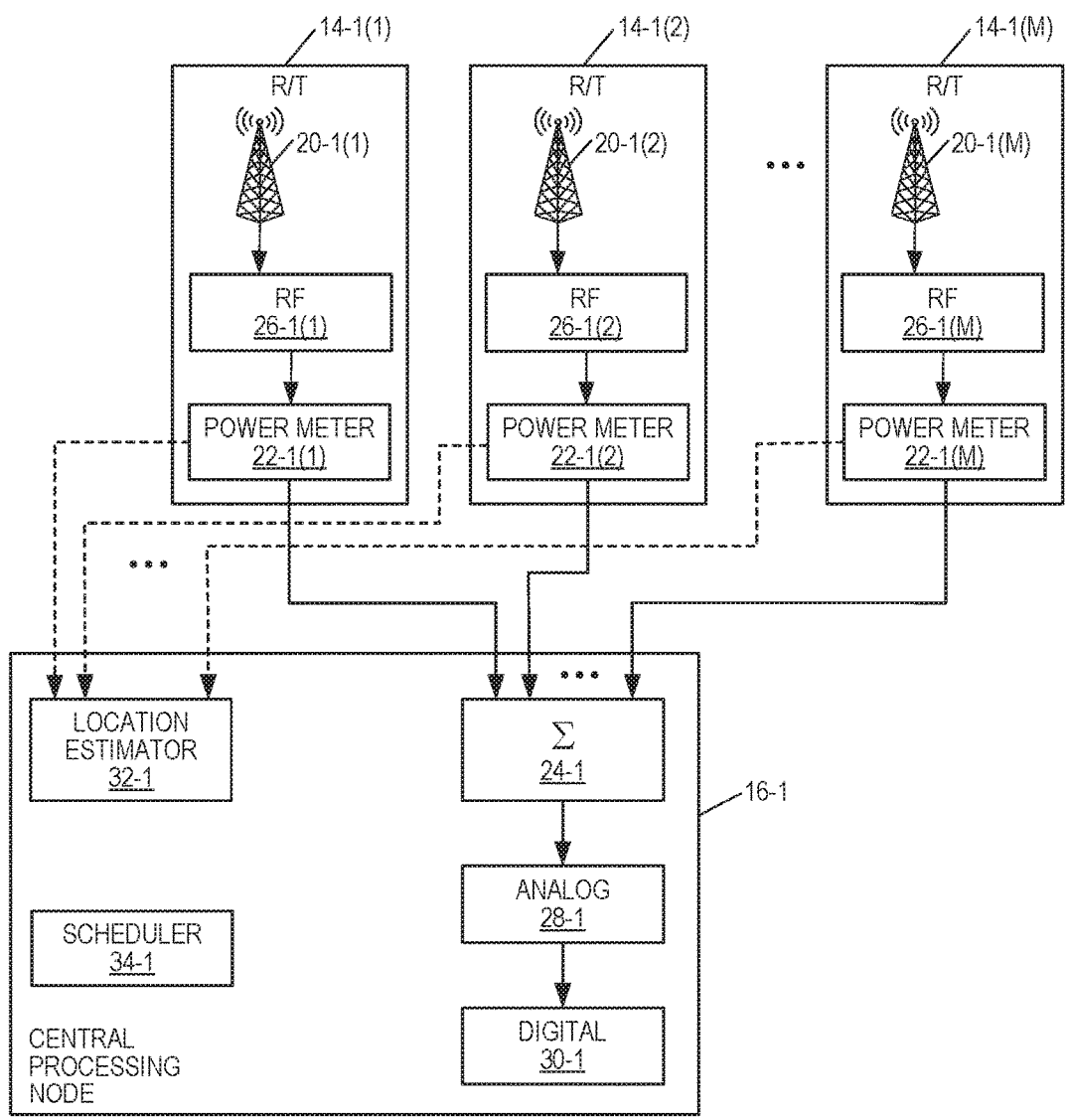
FIG. 9 is a block diagram that illustrates R/T points and a central processing node for a shared cell according to one embodiment of the present disclosure.

As discussed above, the power meters 22-1 may be implemented anywhere in the receive chain prior to summation of the received signals from the R/T points 14-1 of the shared cell 12-1. In this regard, FIG. 9 illustrates one example of an alternative implementation of the R/T points 14-1 and the central processing node 16-1 of FIG. 8. In this embodiment, the R/T points 14-1 include RF components 26-1(1) through 26-1(M), respectively. In this embodiment, the power meters 22-1 are implemented at the R/T points 14-1 prior to RF processing of the received uplink signal by the RF components 26-1(1) through 26-1(M). Otherwise, the embodiment of FIG. 9 is the same as that of FIG. 8.

Figure 10:
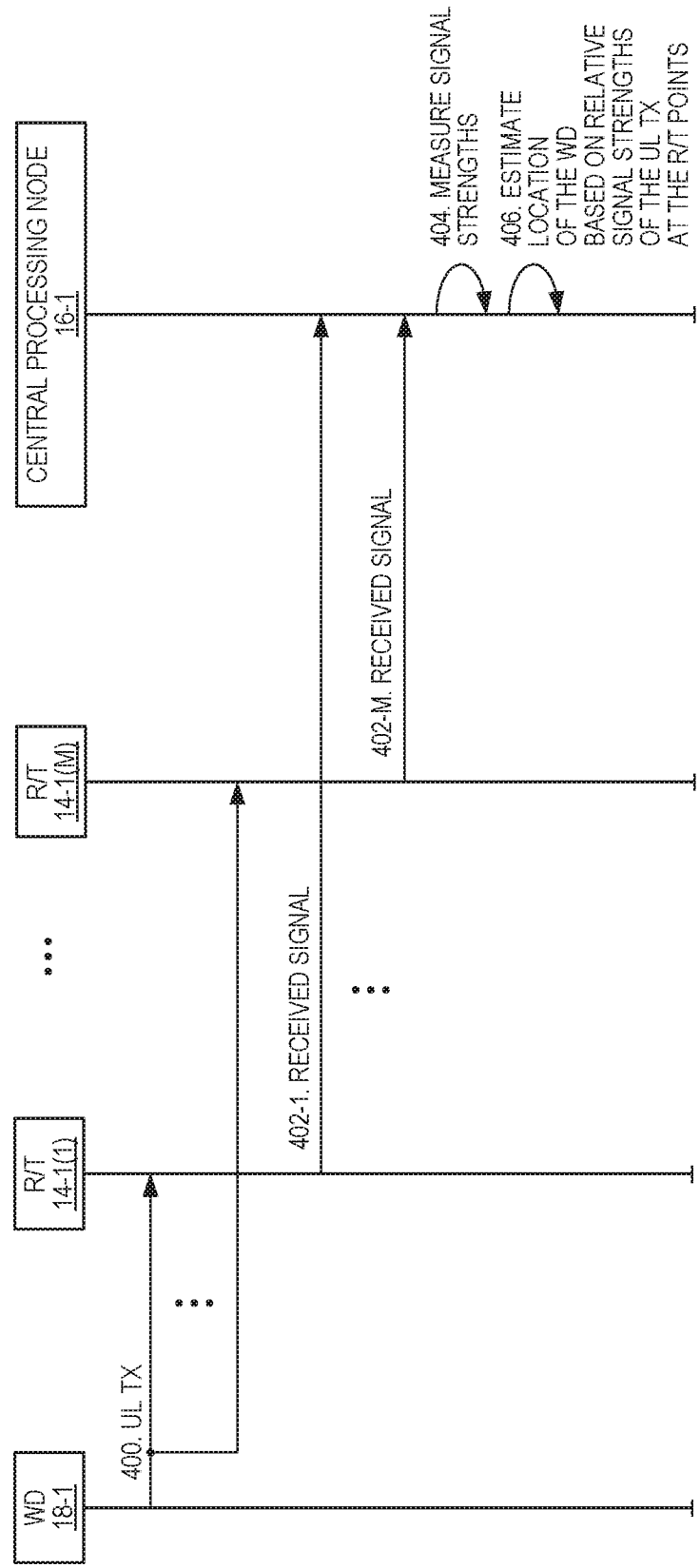
FIG. 10 illustrates a process for determining the location of a wireless device within one of the shared cells of FIG. 1 according to another embodiment of the present disclosure.

In the embodiments discussed above, the measurements of the signal strength of the uplink signal at the R/T points 14-1 are made at the R/T points 14-1. However, the present disclosure is not limited thereto. In this regard, FIG. 10 illustrates the operation of the shared cell 12-1 to determine the location of the wireless device 18-1 according to one embodiment of the present disclosure in which the signal strength measurements are made at the central processing node 16-1. This discussion also applies to the other shared cells 12. The embodiment of FIG. 10 is similar to that of FIGS. 4 and 7. As such, some of the details are not repeated for conciseness.

As illustrated, the wireless device 18-1 transmits an uplink signal (step 400). Again, the uplink signal from the wireless device 18-1 may be any wireless device specific signal such as, for example, a shared channel transmission, a pilot signal transmission, a PUCCH signal transmission, an SRS transmission, a PRACH transmission (if the PRACH transmission can be uniquely associated with the specific wireless device 18-1), or any future signal that may be introduced over time (e.g., via future standard evolutions). As discussed below, in some embodiments, the transmission of the uplink signal by the wireless device 18-1 is scheduled in such a way that any power contributions due to uplink transmissions from other wireless devices 18 in the shared cell 12 and, in some embodiments, uplink transmissions from other wireless devices 18 in neighboring cell(s) is minimized or at least negligible with respect to determining the location of the wireless device 18-1 to within a desired degree of accuracy (e.g., ±50 m).

The uplink signal from the wireless device 18-1 is received by the R/T points 14-1 in the shared cell 12-1, and the R/T points 14-1 provide the resulting received versions of the uplink signal (referred to simply as received signals) to the central processing node 16-1 (steps 402-1 through 402-M). Note that the R/T points 14-1 may perform some processing of the uplink signal (e.g., RF processing such as amplification, filtering, etc.) prior to providing the resulting received signals to the central processing node 16-1. Further, in some embodiments, all of the R/T points 14-1 receive the uplink signal and make corresponding signal strength measurements. However, in other embodiments, the uplink signal may be received by only a subset of the R/T points 14-1, where this subset is one or more or possibly two or more of the group of all of the R/T points 14-1 in the shared cell 12-1.

The central processing node 16-1 generates measurements of the signal strength of the uplink signal at the R/T points 14-1 based on the received signals from the R/T points 14-1 (step 404). As discussed above, for each R/T point 14-1, the measurement of the received signal strength at the R/T point 14-1 is a combined (e.g., averaged) or otherwise processed measurement of the received signal strength at the R/T point 14-1. Further, in one embodiment, the uplink signal from the wireless device 18-1 is scheduled in such a way as to obtain best possible measurements of the received signal strength at the R/T points 14-1. For example, this scheduling may include locating the optimal, or best, uplink frequencies to be used for the uplink transmission or conducting frequency sweeps across the uplink carrier to obtain wideband results.

Once the measurements are made at the central processing node 16-1, the central processing node 16-1 estimates the location of the wireless device 18-1 based on the relative signal strengths of the uplink signal at the R/T points 14-1 (step 406). More specifically, based on the relative signal strengths, the wireless device 18-1 is associated with one of the R/T points 14-1 for which the best signal strength was measured or a group of two or more R/T points 14-1 for which the best signal strengths were measured. Then, the location of the wireless device 18-1 is estimated based on the known locations of the R/T point(s) 14-1 for which the best signal strength(s) was (were) measured, as discussed above.

As mentioned above, in some embodiments, the transmission of the uplink signal from the wireless device 18-1 can be scheduled and/or coordinated (with transmissions in other, e.g., neighbor, cells) such that other transmissions using the same resources as those used for the signal strength measurements are avoided. As an example, consider an embodiment where the power meters 22-1 used to measure the signal strength of the uplink signal at the R/T points 14-1 have basic time synchronization capability but no capability for spectral filtering. In this example, the power meters 22-1 cannot distinguish the uplink signal from the wireless device 18-1 of interest and, e.g., uplink signals from other wireless devices 18 in frequency space. In one embodiment, in order to address this issue, the scheduler 34-1 for the shared cell 12-1 operates to isolate a certain subframe(s) (referred to herein as a measurement subframe(s)) for the wireless device 18-1 of interest such that no other wireless devices 18 in the shared cell 12-1 transmit uplink signals, or at least do not transmit in a data region (e.g., symbol periods 4-13 of the measurement subframe for LTE), during the measurement subframe(s) for the wireless device 18-1 of interest. One example of measurement subframes within the overall uplink radio frame structure is illustrated in FIG. 11.

When scheduling the measurement subframe(s), the scheduler 34-1 may need to consider and handle various types of transmissions. Using LTE as a non-limiting example, the scheduler 34-1 should consider Random Access Channel (RACH), PUCCH (including Channel Quality Indication (CQI), Scheduling Request (SR), and Acknowledgement/Negative Acknowledgement (ACK/NACK)), SRS, and Uplink Shared Channel (ULSCH). In LTE, at least one subframe per radio frame is semi-statically assigned to be available to receive RACH signals. In one embodiment, the scheduler 34-1 operates such that the subframe(s) assigned to be available to receive RACH signals are not used as the measurement subframe(s). Note, however, in another embodiment, the RACH signals are included in the last symbol period of the measurement subframe(s), and the last symbol period is excluded from the signal strength measurements.

With respect to PUCCH, CQI and SR are semi-statically assigned opportunities for periodic reporting. In one embodiment, the scheduler 34-1 operates such that the subframes in which these CQI and SR reports occur are not used as the measurement subframe(s). If no "empty" subframes are available with regard to CQI and SR reporting, the PUCCH attributes of the corresponding wireless devices 18 can be changed through a Radio Resource Control (RRC) reconfiguration message so as to create a better configuration for measuring. As for ACK/NACK, the ACK/NACK appears on the uplink four subframes after the corresponding downlink traffic has been scheduled. Therefore, in one embodiment, the scheduler 34-1 operates to organize downlink shared traffic scheduling to avoid ACK/NACK on the measurement subframe(s).

Note that as part of the uplink power control loop, wireless devices 18 are informed of the targets for received uplink Control Channel (CCH) and ULSCH power as measured at the receiving node. If the power contributions of PUCCH relative to those of ULSCH are small (i.e., if the total power from all wireless devices 18 expected to provide PUCCH in the measurement subframe(s) does not significantly bias the location assessment of the wireless device 18-1 of interest), PUCCH transmissions of other wireless devices 18 may be scheduled within the measurement subframe(s) of the wireless device 18-1 of interest.

SRS is also configured semi-statically for periodic reporting and is similar, in this regard, to PUCCH. As such, in one embodiment, the scheduler 34-1 operates to such that the subframes including SRS are not used as the measurement subframe(s). Also, the SRS occur on isolated symbols within a subframe and can potentially be blanked out as part of the data collection process. Furthermore, many configurations do not use SRS. Systems can operate adequately without SRS.

As for ULSCH, the ULSCH is the channel on which wireless devices 18, such as the wireless device 18-1, transmit uplink data transmissions. In this regard, the scheduler 34-1 operates to, in one embodiment, schedule uplink transmissions such that only the wireless device 18-1 transmits on the ULSCH (i.e., only the wireless device 18-1 of interest transmits uplink data) during the measurement subframe(s).

Note that while the measurement subframe(s) are discussed above, other time periods, or measurement intervals, may be used. For example, the measurement interval may be half of a subframe or 13 out of 14 symbol periods in the subframe (e.g., excluding the last symbol period containing SRS), or the like.

In addition, the scheduler 34-1 may consider inter-cell interference and background interference from "other" cells. Regarding inter-cell interference, uplink traffic from wireless devices 18 in adjacent, or neighboring, cells (in an RF sense) can potentially add unwanted signal power to the measurement subframe(s). In order to avoid or mitigate this unwanted signal power, the scheduler 34-1 for the shared cell 12-1 may cooperate with schedulers of its adjacent cells to perform cooperative scheduling between the shared cell 12-1 and its adjacent cells such this unwanted power in the measurement subframe(s) for the wireless device 18-1 is mitigated or altogether avoided. For instance, the scheduler 34-1 of the shared cell 12-1 may cooperate with the schedulers of its adjacent cells such that no wireless devices 18 in the adjacent cells transmit uplink data during the measurement subframe(s) of the wireless device 18-1 of interest. This is quite practical for at least two reasons. First, it can reasonably be expected that, in, e.g., an indoor system, the processing for the shared cells 12 is centralized and communication between the schedulers of the shared cells 12 is straight forward. Second, even if the above does not apply, the information to be shared between the schedulers of the shared cells 12 is of very small bandwidth and can be allocated in advance. This information can easily be exchanged over, e.g., X2 using ICIC structures.

As for background interference from "other" cells, there may be some cells that cannot be coordinated through ICIC. In an embodiment where the shared cells 12 are in an indoor environment, it is reasonable to expect that these cells are external to (and probably far from) the indoor environment and thus generate a ubiquitous background signal intensity that will be common when comparing signal strength between R/T points 14. Furthermore, the signal from these other cells may be so weak relative to the signal from the wireless device 18-1 of interest as to have no material impact on any assessment of location. Finally, in some embodiments, multi-subframe processing can be used to generate the signal strength measurements, which will act to further reduce any impacts of interference from other cells.

Note that, if synchronization between signal strength, or power, measurements at the different R/T points 14-1 in the shared cell 12-1 of the wireless device 18-1 of interest is an issue, the scheduler 34-1 may, in some embodiments, schedule "blank marker" subframes prior to and/or after the measurement subframe(s). In this manner, the measurements can be isolated in time. These blank marker subframes may also be referred to as guard subframes or guard zones.

In the example above, the power meters 22-1 have basic time synchronization capability but do not have frequency selectivity. For instance, the power meters 22-1 measure power over the entire bandwidth of the uplink carrier. However, the present disclosure is not limited thereto. In general, the power meters 22-1 may have any combination of limited time and/or frequency (or other detection space) discrimination capabilities. For instance, in another embodiment, the power meters 22-1 have basic time synchronization capability and basic frequency selectivity capability. For example, the power meters 22-1 may have a bandwidth in the range of 1-5 MHz. In this example, the scheduler 34-1 for the shared cell 12-1 schedules transmission of the uplink signal by the wireless device 18-1 in time and frequency resources that fall within the bandwidth of the power meters 22-1. For instance, the scheduler 34-1 may schedule the transmission of the uplink signal (e.g., uplink data) during a measurement subframe(s) (as described above) but only over a portion of the bandwidth of the uplink carrier that is within the bandwidth of the power meters 22-1. Notably, uplink transmission from other wireless device(s) 18 in the shared cell 12-1 may be scheduled in other portion(s) of the bandwidth of the uplink carrier in the measurement subframe(s).

FIG. 12 illustrates the operation of the shared cell 12-1 to determine the location of the wireless device 18-1 according to one embodiment of the present disclosure in which the central processing node 16-1 schedules the transmission of the uplink signal to avoid undesired power contributions from other traffic according to one embodiment of the present disclosure. This discussion also applies to the other shared cells 12. The embodiment of FIG. 12 is similar to that of FIG. 4. As such, some of the details are not repeated for conciseness.

As illustrated, the central processing node 16-1 (or more specifically a scheduler 34-1 or scheduler functionality of the central processing node 16-1) sends an uplink scheduling grant to the R/T points 14-1 for transmission to the wireless device 18-1 (step 500 and steps 502-1 through 502-M). As discussed above, the uplink scheduling grant is such that time and frequency resources on which the transmission by the wireless device 18-1 is scheduled match the capabilities of the power meters 22-1. As discussed above, in one exemplary embodiment, the uplink transmission is scheduled over the entire bandwidth of the uplink carrier during one or more measurement subframe(s). In one particular embodiment, the scheduled uplink transmission is an uplink data transmission, and no other data transmissions from any other wireless device 18 in the shared cell 12-1 are scheduled during the measurement subframe(s). In another embodiment, the uplink transmission is scheduled over a portion of the bandwidth of the uplink carrier during one or more measurement subframe(s). In one particular embodiment, the scheduled uplink transmission is an uplink data transmission, and no other data transmissions from any other wireless device 18 in the shared cell 12-1 are scheduled on the portion (e.g., a 1-5 MHz portion) of the uplink carrier during the measurement subframe(s). Further, in some embodiments, ICIC may be performed such that no uplink data transmissions are scheduled in the neighboring cells of the shared cell 12-1 during the measurement subframe.

The wireless device 18-1 transmits an uplink signal according to the uplink scheduling grant (step 504). The uplink signal from the wireless device 18-1 is received by the R/T points 14-1 in the shared cell 12-1 and simultaneous measurements of the signal strength of the uplink signal at the R/T points 14-1 are obtained, as discussed above (step 506). Note that, in some embodiments, all of the R/T points 14-1 receive the uplink signal. However, in other embodiments, the uplink signal may be received by only a subset of the R/T points 14-1, where this subset is one or more or two or more of the group of all of the R/T points 14-1 in the shared cell 12-1.

Once the measurements are obtained, the central processing node 16-1 estimates the location of the wireless device 18-1 based on the relative signal strengths of the uplink signal at the R/T points 14-1 (step 508). More specifically, based on the relative signal strengths, the wireless device 18-1 is associated with one of the R/T points 14-1 for which the strongest signal strength was measured or a group of two or more R/T points 14-1 for which the strongest signal strengths were measured. Then, the location of the wireless device 18-1 is estimated based on the known locations of the R/T point(s) 14-1 for which the strongest signal strength(s) was (were) measured.

The following acronyms are used throughout this disclosure.

3GPP 3$^{rd}$ Generation Partnership Project
ACK Acknowledgement
BB Baseband
CCH Control Channel
CQI Channel Quality Indication
dB Decibel
E911 Emergency 911
eNB Enhanced or Evolved Node B
FCC Federal Communications Commission
GPS Global Positioning System
HARQ Hybrid Automatic Repeat Request
ICIC Inter-Cell Interference Coordination
ID Identifier
IF Intermediate Frequency
LTE Long Term Evolution
m Meter
MHz Megahertz
m/s Meters per Second
NACK Negative Acknowledgement
OTDOA Observed Time Difference of Arrival
PRACH Physical Random Access Channel
PUCCH Physical Uplink Control Channel
RACH Random Access Channel
RAT Radio Access Technology
RF Radio Frequency
RRC Radio Resource Control
R/T Reception/Transmission
SCH Shared Channel
SR Scheduling Request
SRS Sounding Reference Signal
UE User Equipment
ULSCH Uplink Shared Channel
UTDOA Uplink Time Difference of Arrival
WCDMA Wideband Code Division Multiple Access Those skilled in the art will recognize improvements and modifications to the embodiments of the present disclosure. All such improvements and modifications are considered within the scope of the concepts disclosed herein and the claims that follow.

What is claimed is:

1. A method of operation of a central processing node for a shared cell to locate a wireless device within the shared cell, comprising:
obtaining a plurality of signal strength measurements for a signal received from the wireless device at a corresponding plurality of Reception/Transmission, R/T, points in the shared cell, the plurality of signal strength measurements being simultaneous signal strength measurements made on signal discrimination space resources in an uplink of the shared cell matched to capabilities of power meters utilized to generate the plurality of signal strength measurements for the signal received from the wireless device at the plurality of R/T points in the shared cell, wherein the capabilities of the power meters include the capability to measure power across only a portion of a bandwidth of an uplink carrier of the shared cell, and the signal discrimination space resources comprise time and frequency radio resources within a period of time across the portion of the bandwidth of the uplink carrier of the shared cell;
identifying one or more of the plurality of R/T points in the shared cell having the best signal strength measurements of the simultaneous signal strength measurements for the signal received from the wireless device; and
estimating a location of the wireless device based on known locations of the one or more of the plurality of R/T points in the shared cell having the best signal strength measurements.

2. The method of claim 1, wherein the signal discrimination space resources comprise time and frequency radio resources in a measurement subframe of the uplink of the shared cell, and only the wireless device is scheduled to transmit in the measurement subframe of the uplink of the shared cell.

3. The method of claim 1, wherein the signal discrimination space resources comprise a data region of a measurement subframe of the uplink of the shared cell, and only the wireless device is scheduled to transmit in the data region of the measurement subframe of the uplink of the shared cell.

4. The method of claim 1, wherein:
identifying the one or more of the plurality of R/T points in the shared cell having the best signal strength measurements comprises identifying one of the plurality of R/T points in the shared cell having the best signal strength measurement; and
estimating the location of the wireless device comprises estimating the location of the wireless device based on a known location of the one of the plurality of R/T points in the shared cell having the best signal strength measurement.

5. The method of claim 1, wherein:
identifying the one or more of the plurality of R/T points in the shared cell having the best signal strength measurements comprises identifying two or more of the plurality of R/T points in the shared cell having the best signal strength measurements; and
estimating the location of the wireless device comprises estimating the location of the wireless device based on known locations of the two or more of the plurality of R/T points in the shared cell having the best signal strength measurements.

6. The method of claim 1, wherein the capabilities of the power meters include the capability to measure power across an entire bandwidth of an uplink carrier of the shared cell, and the signal discrimination space resources comprise time and frequency radio resources within a period of time across the entire bandwidth of the uplink carrier of the shared cell.

7. The method of claim 6, wherein the period of time is a measurement subframe in an uplink radio frame.

8. The method of claim 7, wherein the measurement subframe is a subframe in which power contributions, as detected by the power meters, from any other wireless devices in the shared cell are negligible.

9. The method of claim 8, wherein the measurement subframe is further a subframe in which power contributions, as detected by the power meters, of any other wireless devices in one or more neighboring cells are also negligible.

10. The method of claim 7, wherein the signal received from the wireless device is an uplink data transmission, and the method further comprises:

scheduling the uplink data transmission from the wireless device during the measurement subframe; and scheduling uplink data transmissions from all other wireless devices in the shared cell such that no other wireless device transmits an uplink data transmission during the measurement subframe.

11. The method of claim 7, wherein the measurement subframe includes Sounding Reference Signal, SRS, symbols in a last symbol period of the measurement subframe, and signal discrimination space resources on which the plurality of signal strength measurements are made exclude the last symbol period of the measurement subframe.

12. The method of claim 10, wherein scheduling the uplink data transmission from the wireless device during the measurement subframe comprises selecting the measurement subframe for the uplink data transmission from the wireless device such that the measurement subframe is not a subframe assigned to be available for reception of Random Access Channel, RACH, signals.

13. The method of claim 10, wherein scheduling the uplink data transmission from the wireless device during the measurement subframe comprises selecting the measurement subframe for the uplink data transmission from the wireless device such that the measurement subframe is not a subframe assigned to be used for Channel Quality Information, CQI, reporting or reception of scheduling requests.

14. The method of claim 10, further comprising scheduling downlink transmissions in the shared cell to avoid transmissions of acknowledgements or negative acknowledgements during the measurement subframe.

15. The method of claim 10, wherein the measurement subframe in which the uplink data transmission from the wireless device is scheduled includes a Physical Uplink Control Channel, PUCCH, transmission from one or more other wireless devices.

16. The method of claim 15, wherein a power contribution of the PUCCH transmission from the one or more other wireless devices is small relative to a power contribution of the uplink data transmission from the wireless device over the measurement subframe.

17. The method of claim 10, wherein scheduling the uplink data transmission from the wireless device during the measurement subframe comprises selecting the measurement subframe for the uplink data transmission from the wireless device such that the measurement subframe is not a subframe assigned to be available for reception of Sounding Reference Signals, SRS.

18. The method of claim 10, further comprising performing Inter-Cell Interference Coordination, ICIC, with one or more neighboring cells to avoid uplink data transmissions from other wireless devices in the one or more neighboring cells during the measurement subframe in which the uplink data transmission from the wireless device is scheduled.

19. The method of claim 10, further comprising providing guard periods before and after the measurement subframe in which the uplink data transmission from the wireless device is scheduled.

20. The method of claim 19, wherein the guard periods are guard subframes.

21. The method of claim 1, further comprising scheduling uplink transmissions for one or more additional wireless device during the time period within one or more other portions of the bandwidth of the uplink carrier.

22. The method of claim 1, wherein each of the plurality of R/T points comprises a corresponding one of the power meters configured to measure the signal received from the wireless device at the R/T point, and the method further includes:

synchronizing the plurality of signal strength measurements of the signal received from the wireless device by the power meters at the plurality of R/T points such that the plurality of signal strength measurements are simultaneous signal strength measurements.

23. The method of claim 1, wherein interference cancellation is utilized to effectively remove signal contributions resulting from known interfering signals in the plurality of signal strength measurements.

24. The method of claim 1, wherein obtaining the plurality of signal strength measurements comprises receiving the plurality of signal strength measurements from the plurality of R/T points.

25. The method of claim 1, wherein obtaining the plurality of signal strength measurements comprises:

receiving representative signals from the plurality of R/T points that are representative of the signal from the wireless device received at the plurality of R/T points; and generating the plurality of signal strength measurements for the signal from the wireless device received at the plurality of R/T points based on the representative signals received from the plurality of R/T points.

26. The method of claim 1, wherein each signal strength measurement of the plurality of signal strength measurements is a signal strength measurement derived from a plurality of signal strength measurements for the corresponding R/T point over a period of time.

27. The method of claim 1, wherein each signal strength measurement of the plurality of signal strength measurements is an average signal strength measurement derived from a plurality of signal strength measurements for the corresponding R/T point over a period of time.

28. The method of claim 1, wherein each signal strength measurement of the plurality of signal strength measurements is a maximum signal strength measurement from a plurality of signal strength measurements for the corresponding R/T point over a period of time.

29. A central processing node for a shared cell, comprising:

a processor; and memory containing software executable by the processor whereby the central processing node is operative to:

obtain a plurality of signal strength measurements for a signal received from a wireless device at a corresponding plurality of Reception/Transmission, R/T, points in the shared cell, the plurality of signal strength measurements being simultaneous signal strength measurements made on signal discrimination space resources in an uplink of the shared cell matched to capabilities of power meters utilized to generate the plurality of signal strength measurements for the signal received from the wireless device at the plurality of R/T points in the shared cell, wherein the capabilities of the power meters include the capability to measure power across only a portion of a bandwidth of an uplink carrier of the shared cell, and the signal discrimination space resources comprise time and frequency radio resources within a period of time across the portion of the bandwidth of the uplink carrier of the shared cell;

identify one or more of the plurality of R/T points in the shared cell having the best signal strength measurements of the simultaneous signal strength measurements for the signal received from the wireless device; and estimate a location of the wireless device based on known locations of the one or more of the plurality of R/T points in the shared cell having the best signal strength measurements.

30. A system for determining a location of a wireless device, comprising:

a plurality of Reception/Transmission, R/T, points in a shared cell configured to receive a signal from the wireless device on signal discrimination space resources in an uplink of the shared cell; and a central processing node configured to:

obtain a plurality of signal strength measurements for the signal received from the wireless device at the plurality of R/T points in the shared cell, the plurality of signal strength measurements being simultaneous signal strength measurements made on the signal discrimination space resources in the uplink of the shared cell matched to capabilities of power meters utilized to generate the plurality of signal strength measurements for the signal received from the wireless device at the plurality of R/T points in the shared cell, wherein the capabilities of the power meters include the capability to measure power across only a portion of a bandwidth of an uplink carrier of the shared cell, and the signal discrimination space resources comprise time and frequency radio resources within a period of time across the portion of the bandwidth of the uplink carrier of the shared cell;

identify one or more of the plurality of R/T points in the shared cell having the best signal strength measurements of the simultaneous signal strength measurements for the signal received from the wireless device; and estimate a location of the wireless device based on known locations of the one or more of the plurality of R/T points in the shared cell having the best signal strength measurements.

31. The system of claim 30, wherein:

each R/T point of the plurality of R/T points is associated with a corresponding one of the power meters that is configured to measure the signal strength of the signal received from the wireless device at the R/T point to provide the corresponding signal strength measurement; and the central processing node is further configured to obtain the plurality of signal strength measurements from the corresponding plurality of R/T points.

32. The system of claim 31, wherein the central processing node is further configured to synchronize the signal strength measurements at the power meters of the plurality of R/T points.

* * * * *